United States Patent [19]

Miller

[11] Patent Number: 4,662,306
[45] Date of Patent: May 5, 1987

[54] FLUFFER MECHANISM FOR BREADING MACHINE

[75] Inventor: Michael E. Miller, Bellevue, Ohio

[73] Assignee: Stein Associates, Inc., Sandusky, Ohio

[21] Appl. No.: 784,429

[22] Filed: Nov. 4, 1985

[51] Int. Cl.$^4$ ............................................. B05C 19/00
[52] U.S. Cl. ...................................... 118/16; 118/24; 118/28
[58] Field of Search ....................... 118/13, 16, 24, 28

[56] References Cited

U.S. PATENT DOCUMENTS 3,045,640 7/1962 Hill et al. ............................. 118/16

Primary Examiner—John P. McIntosh
Attorney, Agent, or Firm—Baldwin, Egan & Fetzer

[57] ABSTRACT

A breading machine for selectively dispensing flour breading or free flowing breading onto a food product, and wherein the machine has a frame and conveyor structure supported on the frame defining a conveyance path having a product inlet end and a product outlet end, and a breading hopper attached to the frame adjacent the inlet end for applying a coating of breading to the food product, and breading pumping slot structure attached to the frame for providing breading to the input end of the conveyor, with a fluffer mechanism mounted on the pumping slot structure for breaking up any caking or lumping of the breading on the conveyor prior to the point of introduction of the food product to the conveyor.

10 Claims, 13 Drawing Figures

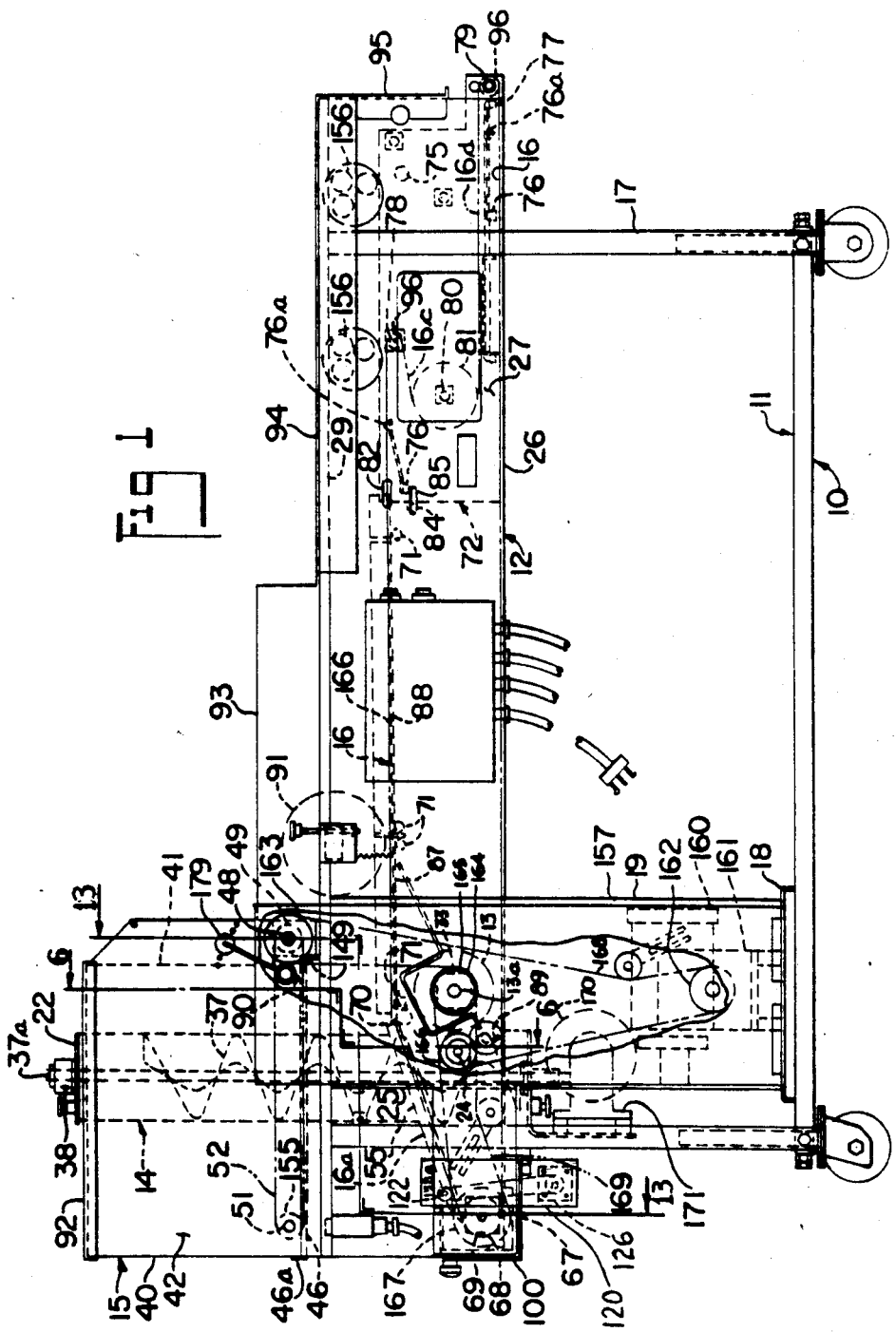

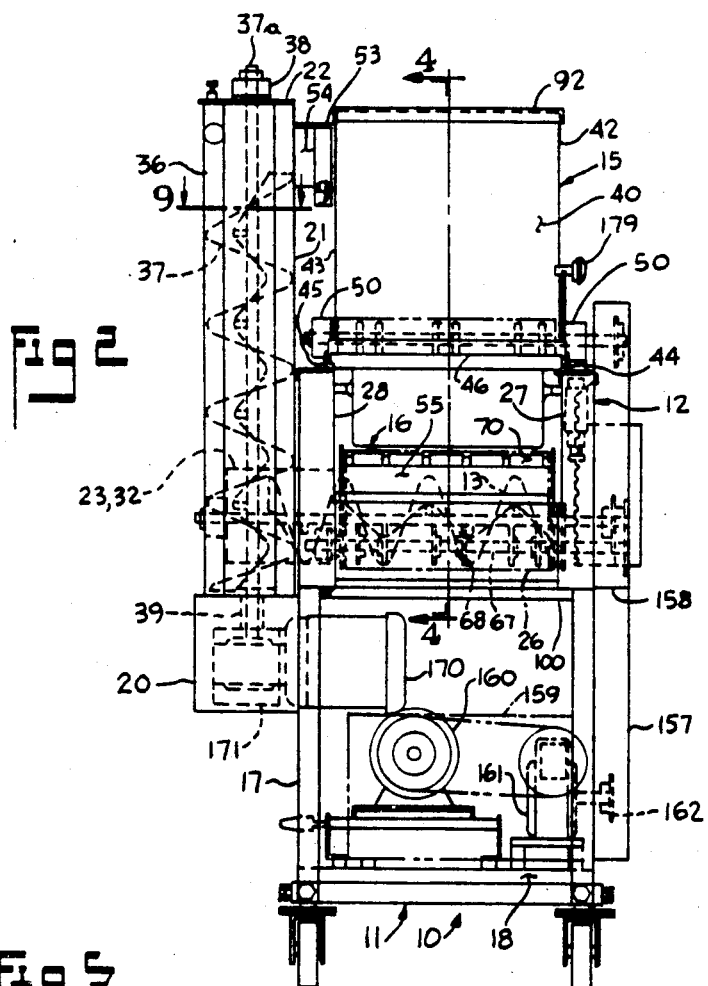
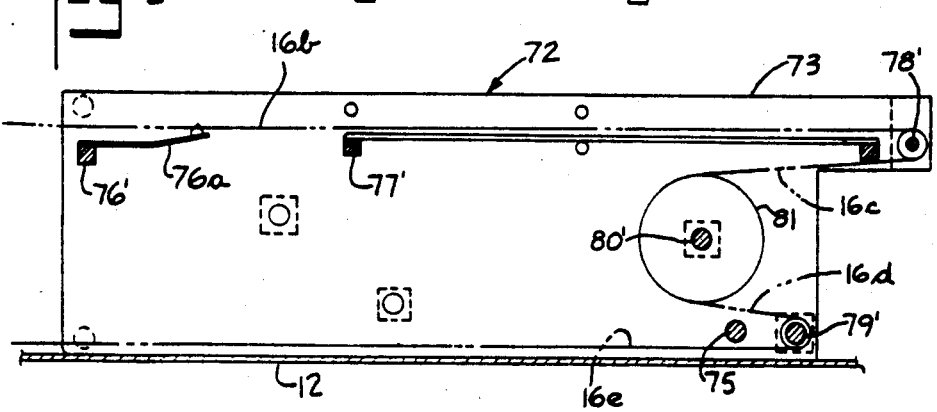

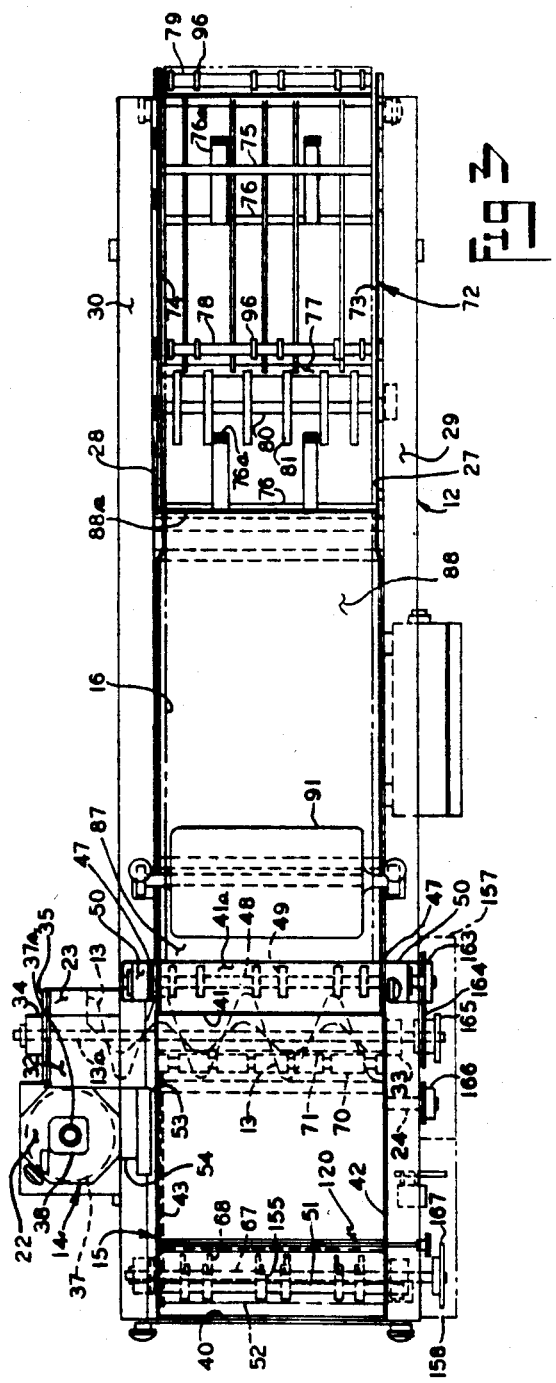

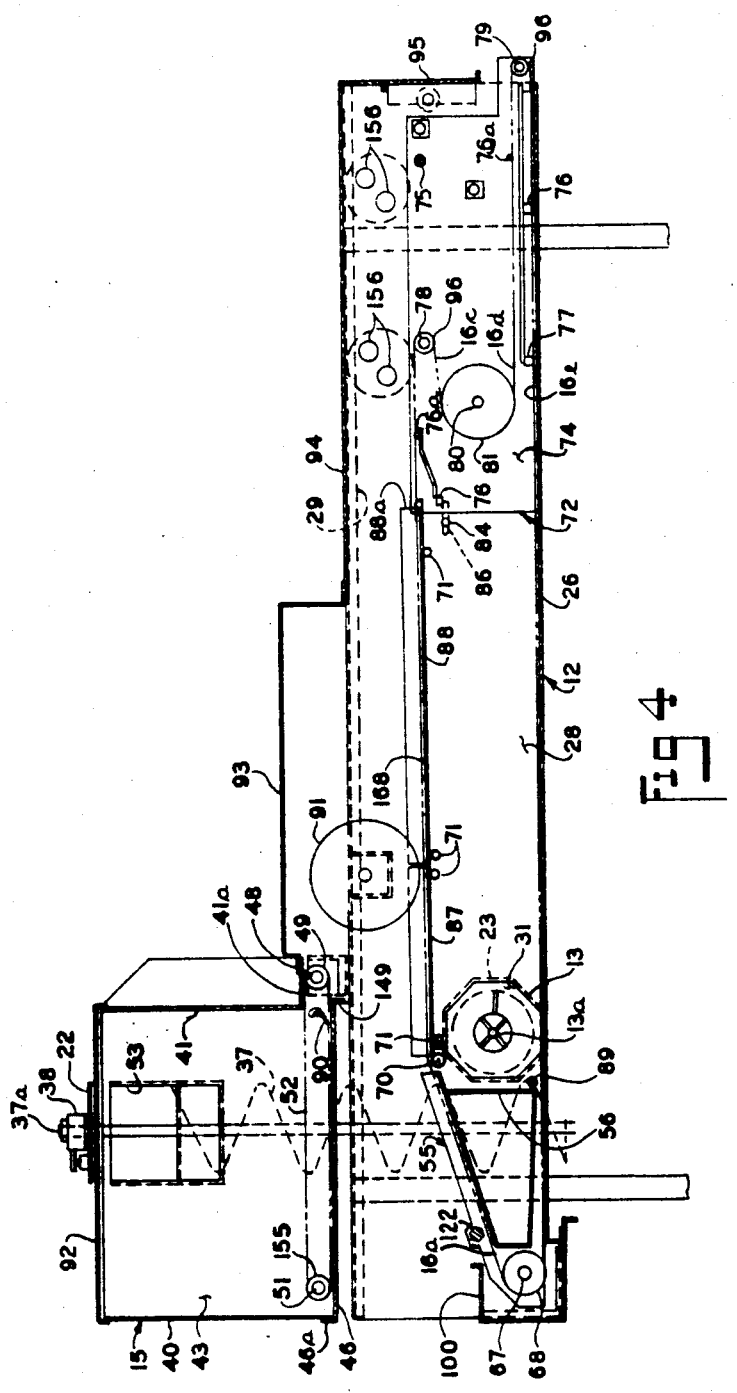

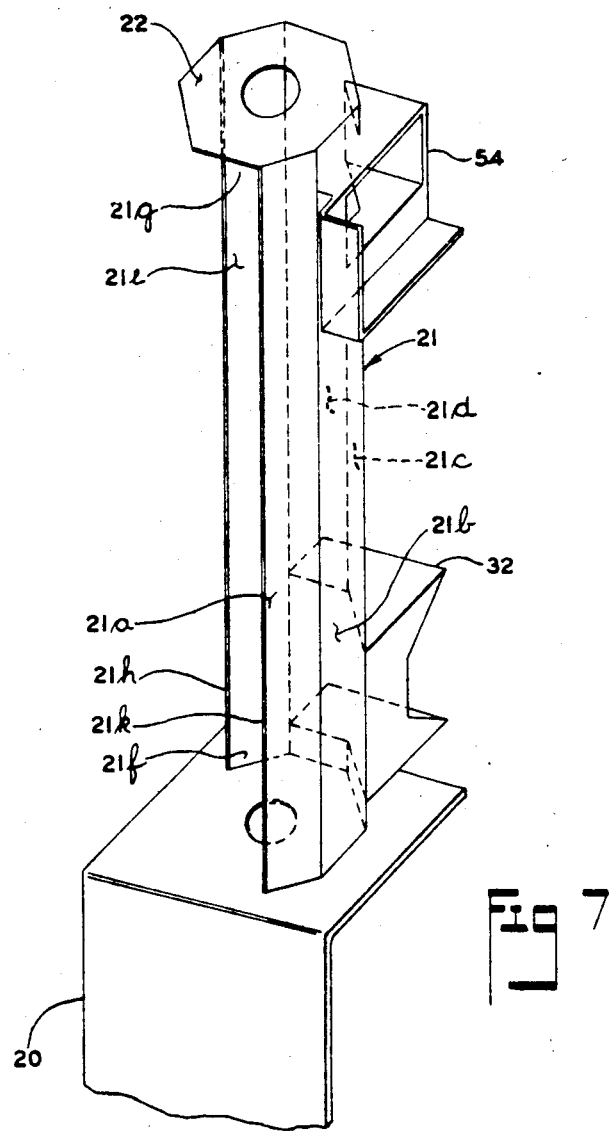

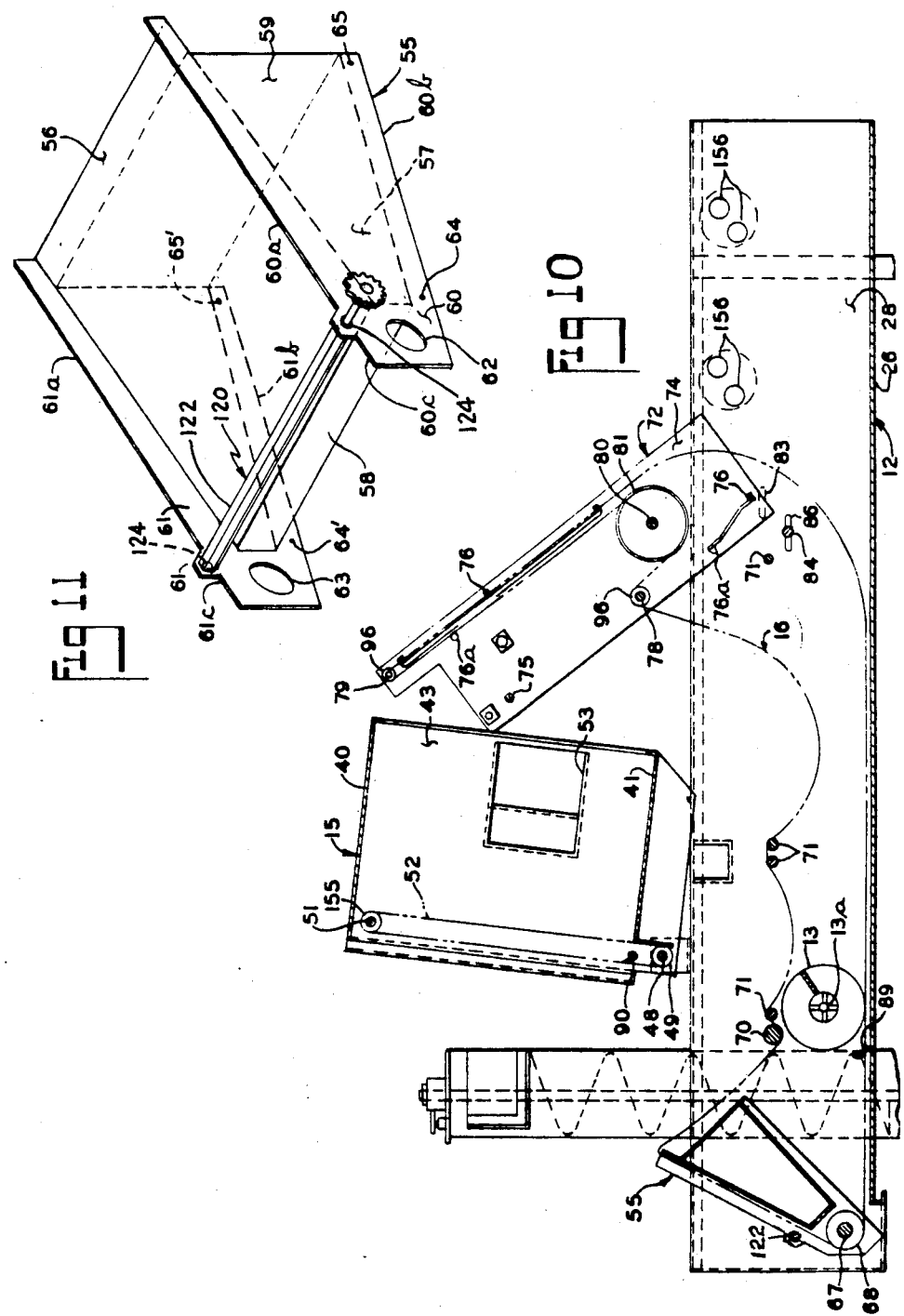

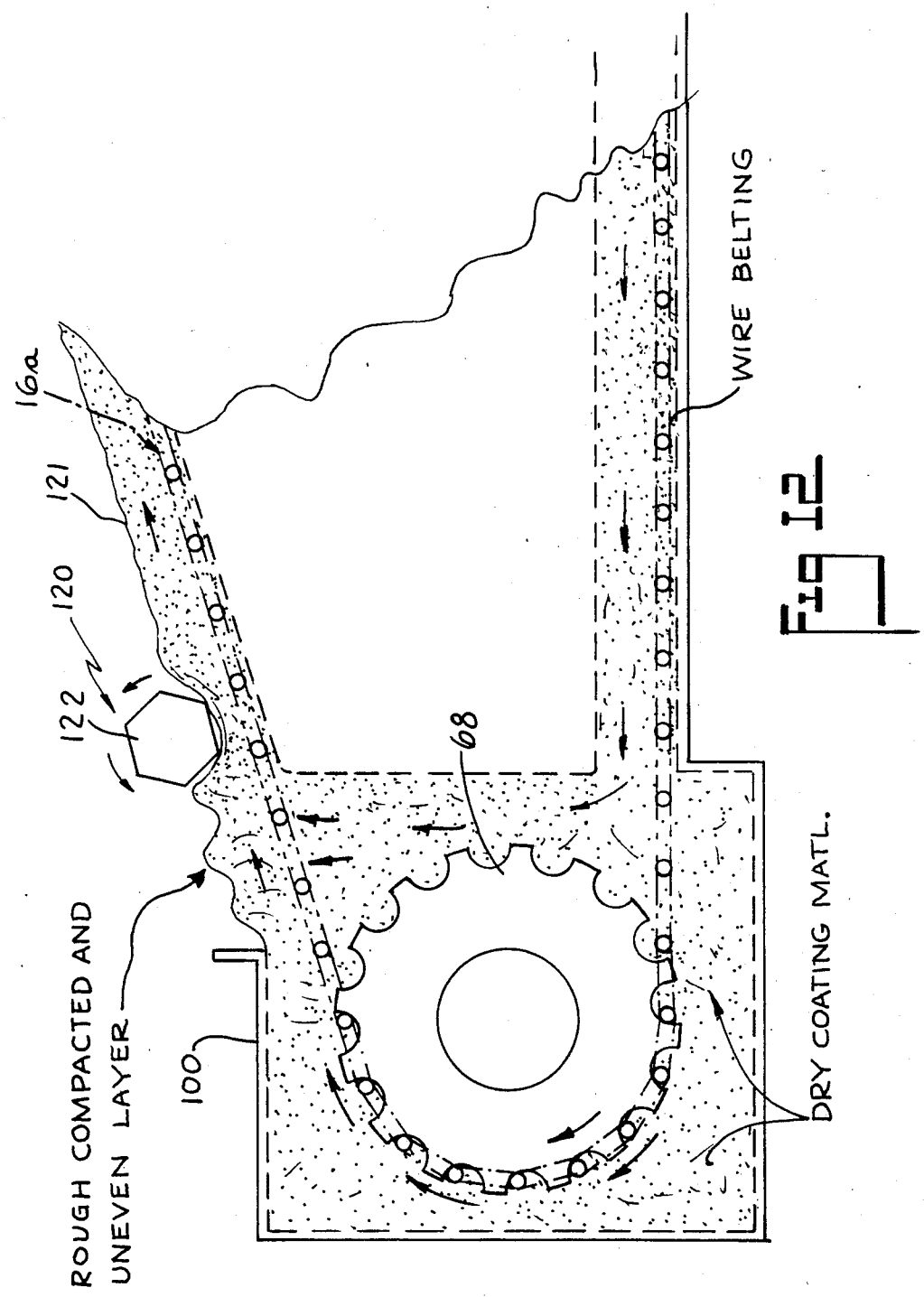

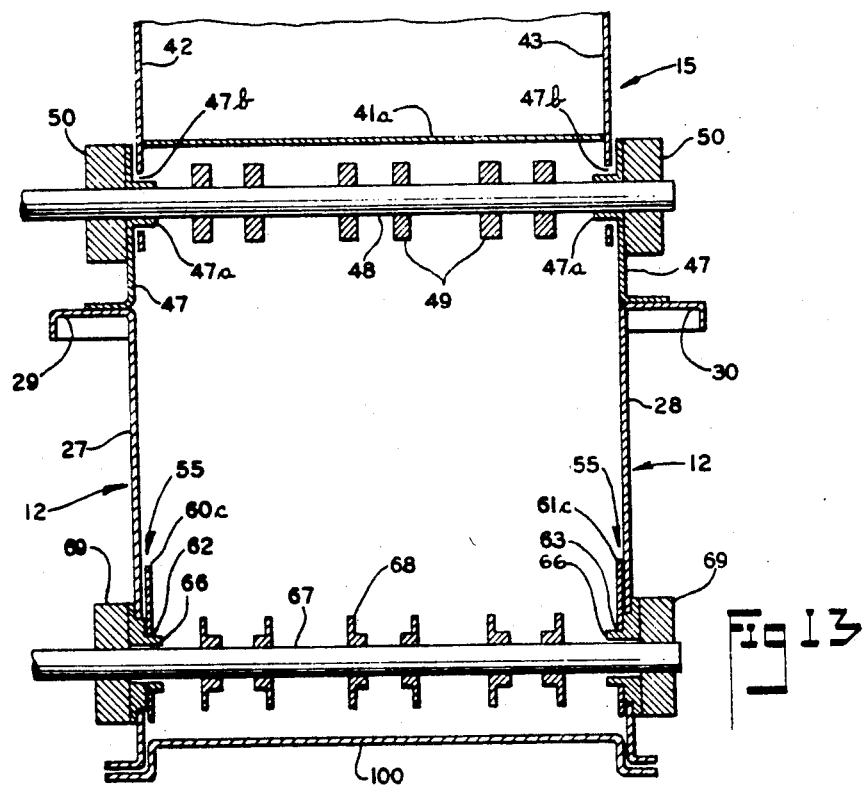

ature: 4,662,306

FLUFFER MECHANISM FOR BREADING MACHINE

This invention relates to a breading machine for selectively dispensing flour breading or free flowing breading for food products. The machine illustrated has a frame and conveyor means supported in the frame defining a conveyance path having a product inlet end and a product outlet end, and a hopper pivotally attached to the frame at the inlet end and movable between a breading dispensing position and a hopper cleaning position, frame support means pivotally attached to the frame at the outlet end and selectively adjustable to provide for flour breading of a food product wherein the said product is flipped over at the outlet end of the conveyor means or for free flowing breading to be applied to the food product wherein the said product exits from the conveyor means in the same manner in which it is initially introduced to the conveyor means, and wherein the frame support means is also adjustable between a conveyor means supporting position and a cleaning position above said conveyor means, and breading pumping slot means pivotally attached to the frame for providing lower layer breading to the input end of the conveyor means and adjustable between a breading dispensing position and a cleaning position. This invention is particularly directed to a lower layer fluffer mechanism adapted for coaction with the breading or coating material, to ensure a generally smooth and uniform "fluffy" lower layer of the breading or coating material.

BACKGROUND OF THE INVENTION

In the field of large scale production of prepared foods, an ever larger variety of food pieces are machine coated with batter and breading or coating before being fried in deep fat. Many additional processes may be required in the total preparation of the food pieces, but this invention relates to breading machines as they are known in the art.

Breading is a dry farinaceous material which takes many forms and usually includes wheat flour in some form. It may also include other grain flour or meal, seasonings, spices, shortenings, etc. Most breading material may be roughly classified by its appearance into one of three classes; flour breading, free flowing breading, or Japanese style crumbs. Each of these has its own pecularities which affect the design of a machine used for applying the breading to food pieces.

For instance flour breading, which consists of finely ground dust-like particles with the normal appearance of wheat flour, have a tendency to pack under pressure. The packing action can make the breading bridge over openings as large as six inches in minor dimension, which in turn makes it difficult to remove from any type hopper in which the bottom slopes upwards and away from a bottom opening. Flour breadings do not flow freely. There are other pecularities of flour breadings which will become apparent later.

Breadings classified as free flowing are usually cracker meal consisting of reasonably hard and roughly spherical particles ranging in size from dust to about three-thirty seconds of an inch in diameter. Such breadings flow so freely that any containment enclosure must have provision to prevent leakage from any cracks or openings. Even a small hole may drain an entire containment enclosure down to the angle of repose of the breading. There are other pecularities of free flowing breadings which will become apparent later.

Breadings classified as Japanese style crumbs and the pecularities of their use are disclosed in U.S. Pat. No. 4,333,415—Miller—Hummel, and are not particularly relevant to the subject invention.

U.S. Pat. No. 4,496,084 issued Jan. 29, 1985 in the names of Raymond E. Booth et al, and entitled Breading Machine discloses a type of breading machine to which the present invention may be conveniently applied.

BRIEF DESCRIPTION OF THE INVENTION

An object of this invention is to provide a breading machine with a simple and effective fluffer mechanism to make the lower layer of flour breading or free flowing breading applied to the input end of the conveyor means, lay in a generally smooth fluffy layer, thus ensuring an even coating of breading to the bottom surfaces of the food products.

Another object of the invention is to provide a fluffer mechanism for use with a breading machine to make the lower layer of flour breading or free flowing breading applied to the input end of the conveyor means of the machine, lay in a generally smooth, fluffy layer, for application thereto of the food product, thus ensuring an even and complete coating to the bottom surfaces of the applied food products.

A still further object of the invention is to provide a fluffer mechanism of the latter type which includes a power driven, rotatable, polygonal shape, in cross section, bar, disposed above the conveyor means of the breading machine, and adapted to coact with the lower layer of breading or coating material applied to the food product receiving conveyor of the breading machine, to break up any caking or lumping of the breading or coating material, and produce a generally smooth, fluffy lower layer of breading or coating material, to which the food product is applied.

Other objects and advantages of the invention will be apparent from the following description taken in conjunction with the accompanying drawings wherein:

BRIEF DESCRIPTION OF THE DRAWINGS

FIG. 1 is a side elevation of a breading machine embodying this invention, in the flour breading mode;

FIG. 2 is an elevation of the infeed end of the breading machine of FIG. 1;

FIG. 3 is a top plan view of the breading machine of FIG. 1, with the dust covers removed;

FIG. 4 is a sectional view taken on line 4—4 in FIG. 2;

FIG. 5 is a partial sectional view similar to FIG. 4, with the discharge conveyor in a free-flowing mode;

FIG. 7 is an isometric view of the fixed half of the vertical screw housing of this invention;

FIG. 10 is a vertical sectional view taken similar to FIG. 4, showing the breading machine completely opened for cleaning;

FIG. 11 is an isometric view of the slot roof member of this invention;

FIG. 12 is a fragmentary, diagrammatic illustration of the fluffer mechanism and inlet end of the conveyor, and its coaction with the lower layer of breading or coating material on the conveyor; and FIG. 13 is a partial section taken on line 13—13 in FIG. 1, showing pivot arrangements for the upper breading hopper and the lower slot roof member of FIG. 11.

DESCRIPTION OF PREFERRED EMBODIMENT

Figure 6:
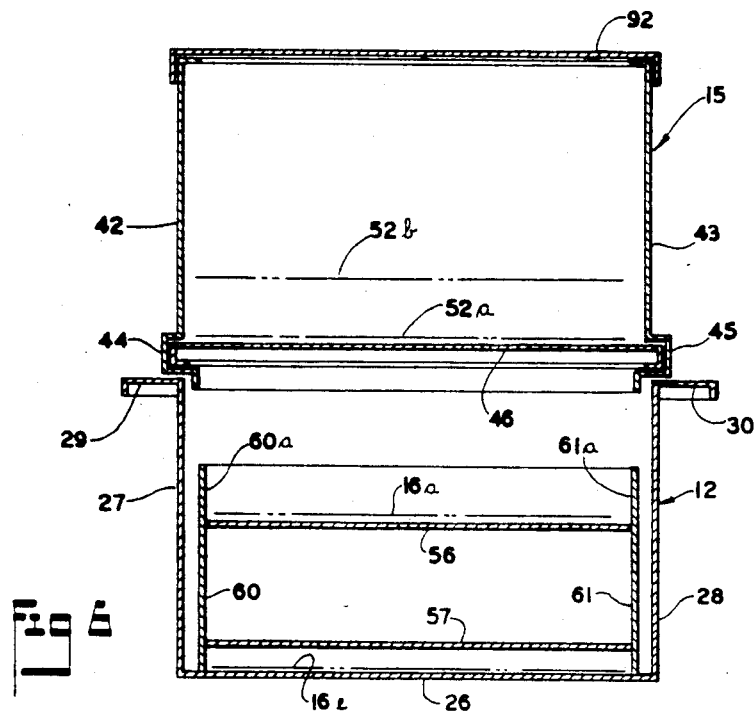
FIG. 6 is a section taken on line 6—6 in FIG. 1.

Referring to FIGS. 1, 2, 3, 4, 6 and 13 a breading machine 10 of this invention includes as major components frame 11 with pan 12, crossfeed screw 13, vertical screw assembly 14, hopper 15, product belt 16, slot roof 55 and discharge conveyor frame 72. Frame 11 includes legs 17, pan 12, main drive base 18, chain back plate 19, vertical screw drive bracket 20, vertical screw fixed housing half 21 with top plate 22, crossfeed housing 23, idler shaft 24 and idler shaft bracket 25, all of frame 11 being welded together. Pan 12 has a bottom wall 26, side walls 27 and 28, and top flanges 29 and 30. Crossfeed housing 23 is welded to wall 28 of pan 12, and wall 28 is perforated with a hole 31 which exactly matches the interior dimensions of crossfeed housing 23 so that breading may be freely passed from pan 12 into crossfeed housing 23 as later described. Crossfeed housing 23 is also welded to transition piece 32, transition piece 32 in turn being welded to vertical screw fixed housing half 21, the interior of transition piece 32 being open throughout so that breading material may be freely passed from crossfeed housing 23 through transition piece 32 into vertical screw fixed housing half 21 as later described. Idler shaft 24 is immovably fastened to wall 27 of pan 12 and idler shaft bracket 25.

Vertical screw assembly 14 consists of fixed housing half 21 which is part of frame 11, movable housing half 36, vertical screw 37, bearing 38 which is bolted to top plate 22 and vertical screw drive coupling 39. Top plate 22 is suitably perforated so that the shaft 37a of vertical screw 37 may pass therethrough and into bearing 38, and vertical screw drive bracket 20 is suitably perforated so that vertical screw drive coupling 39 may pass therethrough.

Hopper 15 has end walls 40 and 41 and side walls 42 and 43. The bottom edge of side wall 42 is formed into an open C-shaped channel 44, with the open side of channel 44 facing side wall 43. The bottom edge of side wall 43 is formed into an open C-shaped channel 45 with the open side of channel 45 facing side wall 42. A removable bottom wall 46 slides in channels 44 and 45 to form a movable bottom wall for hopper 15. Removable bottom wall 46 need not fit tightly into channels 44 and 45 to effect a seal against breading leaks. Breading will not migrate more than a small fraction of an inch into a small gap between two horizontal planar surfaces and there are two such gaps in series between bottom wall 46 and the inner horizontal surfaces of each of channels 44 and 45. Vertical lip 46a formed on the end of wall 46 extends outwardly and upwardly along the outer surface of end wall 40 and stops breading leaks between it and the outside of hopper wall 40 because breading will not migrate at all upwardly into a gap such as that between lip 46a and end wall 40 of hopper 15. No breading leaks at all are experienced between removable bottom wall 46 and hopper 15. The bottom edge of hopper wall 41 in this embodiment is bent to a horizontal flange 41a for stiffening side walls 42 and 43, and to form a sealing surface for the later addition of pressure roll cover 93. Hopper 15 is pivotally mounted on hollow hopper pivots 47, best seen in FIG. 13, which carry hollow projections 47a, the hollow projections 47a being passed into suitable holes 47b in side walls 42 and 43. The bottom side of channels 44 and 45 of side walls 42 and 43 rest respectively on top of flanges 29 and 30 of pan 12 during normal operation of the breader. Hopper pivots 47 are bolted to the top of flange 29 and 30 of pan 12. Hopper drive shaft 48 carrying belt drive gears 49 is rotatably mounted in bearings 50, bearings 50 in turn being bolted to hopper pivots 47. Shaft 48 passes through hollow projections 47a on hopper pivots 47 and thence into bearings 50, as best seen in FIG. 13. Hopper idler shaft 51 carrying collars 155 is preferably immovably mounted between hopper walls 42 and 43 by bolts passing through walls 42 and 43 and thence into the internally threaded ends of shaft 51. Shafts 48 and 51 carry endless hopper belt 52 for moving the breading toward wall 41.

Hopper wall 43 carries an external duct portion 53 which removably mates with duct portion 54 permanently attached to vertical screw fixed housing half 21. Duct portions 53 and 54 form an enclosed duct to allow breading material to move from the inside of vertical screw assembly 14 to the inside of hopper 15, as will be described later.

Referring now to FIG. 11, slot roof member 55 may be seen. Slot roof 55 has a top wall 56, a bottom wall 57, a short end wall 58, a longer end wall 59 and two side walls 60 and 61. Side wall 60 has an extension 60a above top wall 56, and extension 60b below bottom wall 57 and an end extension 60c beyond end wall 58, end extension 60c containing hole 62. Side wall 61 has an extension 61a above top wall 56, an extension 61b below bottom wall 57 and an end extension 61c beyond end wall 58, end extension 61c containing hole 63. The width of projections 60b and 61b is preferably more at locations 64 and 64' than at locations 65 and 65'. All walls 56, 57, 58, 59, 60, 61 are preferably continuously welded where they join so that the enclosed volume is air and water tight.

Referring again to FIGS. 4 and 13, slot roof 55 is pivotably mounted on hollow slot roof pivots 66 with the bottom edges of extensions 60b and 61b of side walls 60 and 61 respectively resting on bottom wall 26 of pan 12. Pivots 66 pass through holes 62 and 63 in slot roof walls 60 and 61 respectively. Belt drive shaft 67 carrying belt drive gears 68 is rotatably mounted in bearings 69 bolted to the outside of walls 27 and 28 of pan 12. Walls 27 and 28 are suitably perforated to allow hollow slot roof pivots 66 to pass therethrough. Shaft 67 then passes axially through the hollow center of slot roof pivots 66, thereby being free to rotate in bearings 69. Transition shaft 70 and cross rods 71 are all preferably immovably fixed between side walls 27 and 28 of pan 12.

Discharge conveyor frame 72 consists of side plate 73 and side plate 74 held in fixed relative position to each other by threaded fasteners not shown passing through suitable holes in side plates 73 and 74 and thence into internally threaded holes in the ends of each cross rod 75, vibratory supports 76 and belt support 77. Side plates 73 and 74 are equipped with bearings not shown in correct position to rotatably support nose shafts 78, 79 each fitted with collars 96, and reverser shaft 80 fitted with collars 81. Side plate 73 is pivotally constrained at slot 82 in side wall 27 of pan 12 so that plate 73 may pivot in a vertical plane with slot 82 as center, or plate 73 may move horizontally. Similarly side plate 74 is pivotally constrained at matching slot 83 in side wall 28 of pan 12. Thus, the entire discharge conveyor frame 72 may pivot in a vertical plane about slots 82 and 83, or frame 72 may move horizontally to the extent of the slots. Cross rod 84 is rigidly fastened inside pan 12 by a threaded fastener passing through slot 85 in wall 27 and another fastener passing through slot 86 in wall 28, and thence into the internally threaded ends of cross rod 84. Cross rod 84 may then be positioned at any horizontal position along the length of slots 85, 86, to hold discharge conveyor frame 72 in any horizontal position desired.

Cross rods 71 support imperforate belt supports 87 and 88 in a desirable position within pan 12. Spring loaded vibrators 76a are mounted on vibrator supports 76 in position to automatically vibrate product belt 16 as it passes to assist in removing excess breading material from under and around product pieces. Product belt 16 must be perforated for a very high percentage of its area and is preferably made from Flat-Flex belting as made by Wire Belt Co. of America. Belt 16 has an inclined section 16a, between main drive shaft 67 and transition shaft 70, which runs in close proximity to top wall 56 of slot roof 55. Horizontal section 16b of belt 16 extends from transition shaft 70 to nose shaft 78, partially supported by belt supports 87 and 88. Horizontal section 16c runs from nose shaft 78 to reverser shaft 80, and horizontal section 16d runs from reverser shaft 80 to nose shaft 79. A final horizontal return run 16e runs from nose shaft 79 to main drive shaft 67. A slot gate 89 is pivotably mounted in side walls 27 and 28 of pan 12 to control breading material flow to a product receiving lower layer on product belt 16a. Gate 89 may be pivoted to any desired angle and locked therein by means 179 shown in FIGS. 1 and 2, and as disclosed in detail in aforementioned U.S. Pat. No. 4,496,084 which is incorporated herein by reference. Hopper gate 90 is pivotably mounted in side walls 42 and 43 of hopper 15 to control breading material flow to a product covering layer on product belt 16b. Gate 90 may be pivoted to any desired angle and locked therein by the lever means 179 shown in FIGS. 1 and 2, the same as aforedescribed for gate 89.

Pressure roll 91 is rotatably mounted in bearings not shown, to produce compacting pressure on breading material on and around product on product belt 16b. Hopper cover 92, pressure roll cover 93, discharge cover 94 and end closure 95 are all removable dust control features with minimum fastenings to the breading machine 10.

Inlet shroud 100 is removably mounted at the infeed end of pan 12 to contain breading material as it passes from under slot roof 55 to the top of wall 56 of slot roof 55. Shroud 100 is removable to permit breading machine 10 to be essentially emptied of breading at the end of operation thereof. The configuration of shroud 100 may be any of many forms as long as it will seal against the end flanges of pan 12.

Referring now to FIG. 5, the discharge conveyor frame 72 may be seen in a mode suitable for running breading machine 10 with free flowing breading material. Frame 72 is assembled with side plates 73 and 74 upside down and changed in relation to their position in FIGS. 1 and 4. Nose shaft 78 has been moved to position 78', nose shaft 79 has been moved to position 79', reverser shaft 80 has been moved to position 80', vibrator support 76 has been moved to position 76' and belt support 77 has been moved to position 77'. Belt sections 16b, 16c, 16d and 16e have all changed length, but the total length of product belt 16 remains the same. Product discharge to further processing is from nose shaft 78 in position 78' whereas in FIGS. 1 and 4 product discharge was from nose shaft 79.

Figure 9:
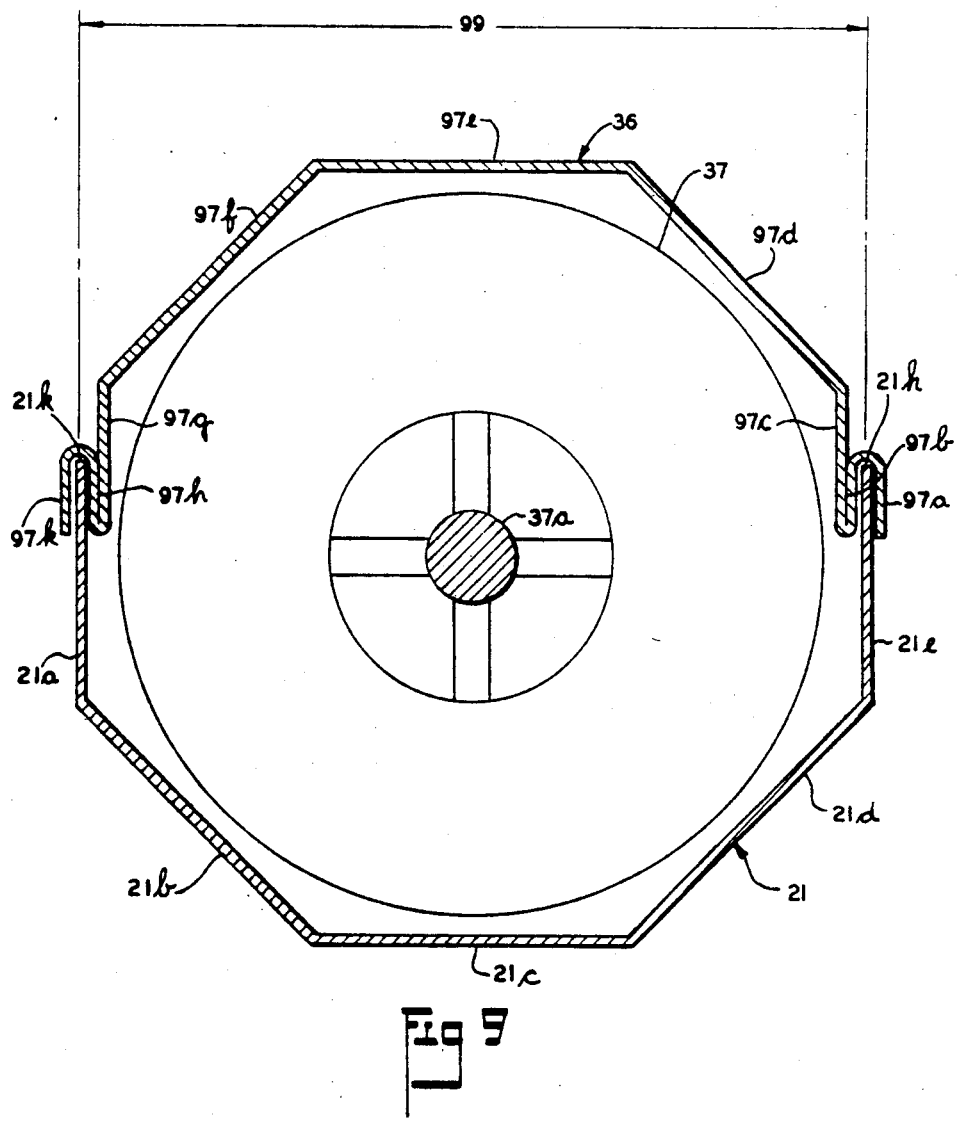
FIG. 9 is an enlarged section of the vertical screw housings taken on line 9—9 in FIG. 2.

Referring now to FIG. 7 the construction of the vertical screw fixed housing half 21 may be seen. Housing half 21 is made from a single sheet of stainless steel bent on four parallel lines to form five sides 21a, 21b, 21c, 21d, 21e, of a tube with a nearly octagonal cross section. Sides 21a and 21e are less than full width sides as best seen in FIG. 9. The included angle between any two adjacent sides is one hundred thirty-five degrees. Lower end 21f is positioned accurately on vertical screw drive bracket 20 and fully welded thereto. Upper end 21g is accurately positioned and completely welded to top plate 22. The combination of accurate positioning and full welding insures that edges 21h and 21k are truly parallel in a vertical plane. Transition piece 32 is shown for reference only.

Figure 8:
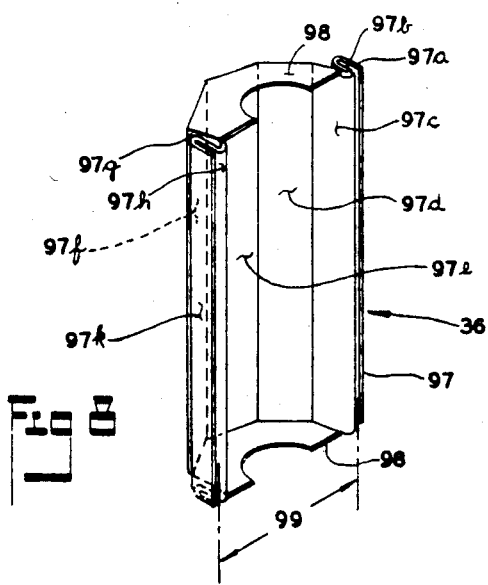
FIG. 8 is an isometric view of the movable half of the vertical screw housing of this invention.

Referring now to FIG. 8, the vertical screw movable housing half 36 may be seen. A single sheet of stainless steel 97 is bent on four parallel lines to form five sides 97c, 97d, 97e, 97f, 97g, of a tube of nearly octagonal cross section. Sides 97c and 97g are less than full width sides as best seen in FIG. 9. The included angle between any adjacent two of these five sides is one hundred thirty-five degrees. An additional four bends on lines parallel to the original four bends form narrow parallel slots outside of sides 97c and 97g. The bend between side 97c and slot wall 97b is 180° so the outside of slot wall 97b and the outside of side 97c are actually touching full length. The bend between slot wall 97b and slot wall 97a is also 180°, but slot walls 97a and 97b are parallel and about one-eighth inch apart. The bend between side 97g and slot wall 97h is 180° so that the outside of slot wall 97h and the outside of 97g are touching full length. The bend between slot wall 97h and slot wall 97k is also 180°, to make slot walls 97h and 97k parallel and about one-eighth inch apart. The ends of sheet 97 are accurately positioned and fully welded to end plates 98 so that all bend lines are truly parallel. It is also important that the horizontal center to center dimension 99 between slots be equal to the horizontal center to center distance between edges 21h and 21k of vertical screw fixed housing half 21 as seen in FIG. 7.

Referring now to FIG. 9, the relationship between vertical screw housing halves 21 and 36 may be seen. Edge 21k of side 21a of housing half 21 is inserted into the slot formed by slot walls 97h and 97k of housing half 36. Similarly, edge 21h of side 21e of housing half 21 is inserted into the slot formed by slot walls 97a and 97b of housing half 36. As housing half 36 is moved closer to housing half 21 so that side 97e of housing half 36 approaches side 21c of housing half 21, edges 21h and 21k are pressed ever tighter into their respective slots in housing half 36. Edges 21h and 21k eventually reach the bottom of their respective slots in housing half 36 to very effectively seal the vertical joints in the housing.

Referring to FIGS. 1, 3 and 4, the configuration and arrangement of the crossfeed screw 13 may be seen. Screw 13 has an axial shaft 13a rotatably mounted in bearings 33 and 34, bearing 33 being bolted to the outside of wall 27 of pan 12 and bearing 34 being bolted to the outside of crossfeed and closure plate 35. Wall 27 of pan 12 and end closure plate 35 are both perforated with suitable holes to permit shaft 13a to pass therethrough and thence into bearings 33 and 34. The helical portion of screw 13 as seen in FIGS. 3 and 4 extends from close proximity to the inside of wall 27, through hole 31 in wall 28 of pan 12 and partway into the interior of crossfeed housing 23. As seen in FIG. 4, the helical portion of screw 13 is spaced above bottom wall 26 of pan 12 a minor fraction of an inch, about three-eighths, and away from wall 59 of slot roof 55 about an inch.

Referring now to FIGS. 2, 3 and 9, it may be seen that when vertical screw movable housing half 36 is installed on breading machine 10, all of housing half 36 is below top plate 22 of fixed housing half 21 and above drive bracket 20, with end plates 98 of housing half 36 in close proximity to the under side of top plate 22 and the top side of drive bracket 20. Close proximity in this case means that end plates 98 of housing half 36 will be parallel to top plate 22 and drive bracket 20, and that the gap between end plate 98 and either top plate 22 or drive bracket 20 may be about one-sixteenth of an inch. Experience with other breading handling equipment has shown that when two rigid planar surfaces are parallel and at rest relative to each other, with a gap between of as much as one-sixteenth inch, that breading will not migrate by vibration more than about one inch from a gap edge into the gap. Therefore, because the minimum width of the gaps between an end plate 98 and either top plate 22 or drive bracket 20 is more than one inch, there is no fear of breading leaks from the gaps.

Locks in some form are necessary to hold housing half 36 in the necessary close proximity to housing half 21, and in this embodiment are simple thumb screws, one of which passes vertically downward through a threaded hole in top plate 22 of housing half 21 and into a matching unthreaded hole in top end plate 98 of housing half 36, with the second thumb screw passing vertically upward through a threaded hole in vertical screw drive bracket 20 into a matching unthreaded hole in bottom end plate 98 of housing half 36. Many other forms of locks could be used in place of the thumb screws.

It should be noted here that the length of the vertical screw assembly 14 of this invention is far less than other typical breading machines previously mentioned, and extends from only slightly below the return run 16e of product belt 16 to slightly above the top of hopper 15. In this embodiment, the actual length from the top of vertical screw drive bracket 20 to the under side of top plate 22 of housing half 21 is less than thirty-three inches. This short length is not only less expensive to make, but is far easier to seal full length than are the long vertical screws described previously.

Referring now in particular to FIGS. 3, 4, 11 and 12, in accordance with the invention, there is provided a fluffer mechanism 120 which is mounted adjacent the product input end of conveyor belt 16, and particularly in coaction with section 16a thereof. Fluffer mechanism 120 is adapted to ensure a generally smooth, fluffy layer 121 (FIG. 12) of the breading or coating material on the conveyor belt prior to the introduction of the food products to the conveyor belt and lower layer of breading material thereon. Sometimes during production runs, the breading material becomes damp and tends to cake and lump. This produced smooth and fluffy layer helps to ensure a complete and even coating of the breading material to the bottom surfaces of the food products. This is particularly important when coating light generally flat products, in order to obtain a generally even coating on the bottoms thereof.

Fluffer mechanism 120 comprises an elongated barlike member 122 of multi-sided configuration in transverse section (which is hexagonal in the embodiment illustrated and is preferred). Member 122 is rotatably mounted in preferably bearings 124, which in the embodiment illustrated are supported on slot roof member 55.

A motor unit 126 (FIG. 1) which is preferably a hydraulic motor, rotatable at a speed of between 400 to 500 revolutions per minute, is operatively coupled to member 122 as by means of a sprocket and chain drive, for rotating member 122 in the direction of movement of conveyor 16, and as illustrated in FIG. 12.

Member 122 rotating at a relatively high speed compared to the speed of the conveyor and associated layer of breading material, effectively breaks up any lumps and caking in the breading being moved onto the upper stretch of conveyor section 16a, and produces a smooth fluffy layer 121 of breading for introduction of the food products thereon.

Referring now to FIGS. 1 and 2, the other drives may be seen for the breading machine of this invention. In this embodiment, a variable speed electric drive consisting of motor 160, gearbox 161, and other components furnish rotation to roller chain sprocket 162. Sprocket 163 is fixed on hopper drive shaft 48, sprockets 164 and 165 are fixed on crossfeed screw shaft 13a, sprocket 166 is free to rotate on idler shaft 24 and sprocket 167 is fixed on belt drive shaft 67. An endless roller chain 168 extends from counterclockwise around sprocket 162 to counterclockwise around sprocket 163, to clockwise around sprocket 164 to counterclockwise around sprocket 166 and back to sprocket 162. A second endless roller chain 169 extends from clockwise around sprocket 165 to clockwise around sprocket 167 and back to sprocket 165. Thus a single drive source turns the three driven shafts 48, 13a and 67 in the correct directions, and sprocket sizes can be calculated for any desired relative rotational speeds between shafts 48, 13a and 67. It should be noted that any of several types of electric drives can furnish rotation to sprocket 162, including any of several types of variable speed drives. It should also be noted that the electric drive can be replaced by a hydraulic drive, wherein a variable speed hydraulic motor furnishes rotation to sprocket 162. A main drive method for the shafts 48, 13a and 67 is essential, but the type of drive is not critical. Also in this embodiment, a fixed speed motor 170 drives a gear reducer 171 mounted on vertical screw drive bracket 20. The output shaft of gear reducer 171 is fixed into vertical screw drive coupling 39, so that the bearings within gear reducer 171 maintain alignment of the lower end of vertical screw shaft 37a. The use of a fixed speed drive for the vertical screw is far simpler than driving the screw from the main drive, and it has other advantages. If the vertical screw were driven by the main drive, the vertical screw must run at an optimum speed when the main drive is operating at its slowest speed. Then when the main drive runs at faster speeds, the vertical screw will run faster than optimum, sometimes two to three times optimum. Vertical screw speeds much higher than optimum destroy breading faster and wear out components faster. A fixed speed vertical screw can always run at optimum speed, regardless of main drive speed. Optimum speed for the vertical screw of this invention is about three hundred to three hundred fifty revolutions per minute. A further advantage to the fixed speed drive for the vertical screw is that the vertical screw may be turned by hand during cleanup, for access to all surfaces. This is not possible when the vertical screw is driven by the main drive arrangement. It should be noted that if the main electric drive is replaced by an hydraulic drive motor, the fixed speed vertical screw drive can also be replaced by a variable speed hydraulic motor. In this case, the hydraulic motor shaft would be fixed in the vertical screw drive coupling 39. The advantage of a fixed speed vertical screw drive would be partly lost if the vertical screw drive were hydraulic, but the advantage of a separate drive is maintained.

Referring now to FIG. 10 the breading machine of this invention may be seen in a fully open position for cleaning. Vertical screw movable housing half 36, inlet shroud 100, hopper cover 92, pressure roll cover 93, discharge cover 94, end closure 95, hopper bottom pan 46, pressure roll 91, and belt supports 87 and 88 have all been removed without tools and do not show in FIG. 10. In addition, hopper 15 has been pivoted clockwise about 90° from its operating position, discharge conveyor 72 has been pivoted about 110° counterclockwise from its normal operating position, and slot roof 55 has been pivoted about 45° counterclockwise from its normal operating position. In the configuration of FIG. 10, all surfaces of the machine which come in contact with food are visible and all may be reached either by hand or with simple cleaning tools and water sprays. Cleaning is simple, fast and effective.

Referring now to FIGS. 2, 3, 4, the operation of the crossfeed screw 13 can be described. It is known by those skilled in the art of screw conveyors, that a horizontal screw conveyor must be at least partially enclosed in order to move material axially along the the screw. Frequently, the enclosure consists of a U-shaped trough with a bottom radius slightly greater than the diameter of the screw. The top of the U-shape may be either covered or uncovered for highly efficient design. However, in the breading machine of this invention, high efficiency of the crossfeed screw 13 is not critical, so that the enclosure for crossfeed screw 13 can be greatly simplified. In this invention, the crossfeed screw section between side walls 27 and 28 of pan 12 may be considered to have a partial enclosure consisting of a bottom wall being that portion of pan bottom 26 directly under screw 13, and a side wall being end wall 59 of slot roof 55 together with the slot gate 89. Screw 13 has lefthand helical flighting and rotates in a clockwise direction so that the two walls as described for screw 13 allow the screw to function in a very satisfactory manner. The placement of screw 13 above belt run 16e thus utilizes existing machine structures, which are primarily for other reasons, for the screw housing within pan 12. The special screw housings for crossfeed screws as are shown in U.S. Pat. Nos. 2,855,893—Greer, 3,596,189—Porter et al and 3,647,189—Johnson are thus eliminated.

The operation of the breading machine of this invention may be as follows. Referring to FIGS. 2, 3 and 4, the hopper 15 can be filled with either flour or free flowing breading. Usually hopper gate 90 and slot gate 89 are adjusted for minimum flow. When the machine is started, drive motors 160 and 170 will start, so all driven parts run at selected operating speed. Hopper belt 52 discharges a layer of breading over lip 149 of hopper bottom pan 46, the layer being the full horizontal width of hopper wall 41. This breading layer falls in a curtain toward imperforate belt support 87. The main product belt section 16b, moving from transition shaft 70 toward nose shaft 78, will move breading with it toward shaft 78. As breading reaches end 88a of belt support 88, free flowing breading will fall through belt portion 16b toward pan bottom 26. Flour breading may remain on belt portion 16b until belt vibrators 76a under belt portion 16b urge it through belt portion 16b. This falling breading, upon reaching pan bottom 26, is carried toward main drive shaft 67 by belt portion 16e. As breading moves with belt portion 16e, it first passes under crossfeed screw 13. If the layer is less than three-eighths inch thick, crossfeed screw 13 has no effect on this layer. The layer continues with belt portion 16e under slot gate 89, and into a pumping slot formed by bottom wall 57 of slot roof 55, side wall extensions 60b and 61b of slot roof 55, and bottom wall 26 of pan 12. Note here that the function and mechanics of this slot are described in U.S. Pat. Nos. 3,915,116; 3,967,583 and 4,016,299. The layer of breading on belt portion 16e will fill all voids around drive shaft 67, then a thin breading layer will start to move up top wall 56 of slot roof 55, the thin layer carried by belt portion 16a. This breading layer is fluffed by fluffer mechanism 120, as aforedescribed, and the food products are introduced thereon.

This thin layer of breading on belt portion 16a is carried over onto belt portion 16b, where additional breading is added from the hopper as described above. Again, the breading from belt portion 16b falls through the belt at end 88a of belt support 88, and is carried by belt portion 16e toward main drive shaft 67. Now the breading is thicker on belt portion 16e, so some will be skimmed off the layer by crossfeed screw 13 and will be moved into crossfeed screw housing 23. Additionally, when the breading layer on belt portion 16e is thicker than can pass under slot gate 89, the excess above the bottom of slot gate 89 will be scraped off the layer and retained by slot gate 89 and end wall 59 of slot roof 55. As more breading is retained by slot gate 89 and end wall 59, some of this breading will be moved by crossfeed screw 13 into crossfeed screw housing 23. A steady state is reached quickly where excess breading reaching slot gate 89 is moved by screw 13 into crossfeed housing 23.

As the actions above described continue, the breading carried into crossfeed screw housing 23 will discharge into the bottom of vertical screw housing assembly 14, there to be picked up by vertical screw 37 and carried upwards to duct 54 where it is discharged through duct 54 into duct 53 and thence back into hopper 15. The entire sequence as described from the start of motors 160 and 170 will take about thirty to forty seconds when product belt 16 is moving at forty feet per minute.

With the breading machine of this invention now running at a selected speed and circulating breading into product receiving layer on product belt portion 16a and under a product covering layer above product belt portion 16b, the thickness of the layers may be adjusted as desired. The top covering layer can be varied by adjusting hopper gate 90 by the means previously described in FIGS. 20 and 21. The bottom product receiving layer can be varied by adjusting slot gate 89 in a manner similar to that described in FIGS. 20 and 21 for gate 90. The adjustments are independent, and in this embodiment, the layers may be quickly and easily adjusted from about one-quarter inch thick to three-quarters inch thick. Whenever the thickness of a breading layer is changed, the machine quickly attains a new steady state of operation. Any extra breading required is supplied by the hopper, and any excess that develops will be retained in the hopper. For instance, if a shovelfull of breading is manually added to belt portion 16b, it will quickly appear in hopper 15 and stay there until needed. Other embodiments of this invention can be built wherein the breading layers can be much thicker if desired.

In the embodiment shown in FIG. 4, pieces of food product already coated with batter in a machine not shown are deposited on the bottom breading layer on product belt 16 in the vicinity of transition shaft 70. After the top cover layer of breading is discharged from hopper 15 as previously described, belt portion 16b carries the product under pressure roll 91 to compact the breading on and around the product pieces and press the breading into the batter on the product pieces.

As the product reaches belt support end 88a, excess breading under and around the product pieces falls through belt portion 16b as previously described. The product pieces still carrying an excess of breading on top reach nose shaft 78, and turn upside down as they are discharged over nose shaft 78. Excess breading which was on top of the product pieces falls off and through belt portion 16d to pan bottom 26, where it is engaged by belt run 16e and carried back toward drive shaft 67 for recycling. The finished product is then discharged over shaft 79 from belt portion 16d to further processing. The method of breading product as described in this paragraph is especially suited to flour type breading and is sometimes acceptable for use with free flowing breadings.

However, as previously mentioned in the description of FIG. 5, free flowing breading is usually used in conjunction with a product carrying belt which does not flip the food product to remove excess breading. When the discharge conveyor 72 is used in the mode of FIG. 5, excess breading is removed from the top of the food pieces by using an air curtain similar to that shown in U.S. Pat. No. 3,647,189. Perforated air tubes not shown may be inserted through holes 156 in the side walls 27 and 28 of pan 12 in any of several combinations. The tube perforations then deliver multiple air streams to remove the excess breading from the top of the product pieces. This method of removing excess breading is old art.

It should be noted that drives are guarded for safety. Chain guards 157 and 158, 158a as seen in FIGS. 1, 2, 3 completely cover all sprockets and roller chains, while a guard 159, indicated in broken lines in FIG. 2, covers motor pulleys and V-belt drive.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

I claim:

1. In a breading machine for selectively dispersing flour breading or free flowing breading on a food product passing therethrough comprising a frame defining a product conveyor path, conveyor means for conveying the product along said path and having a product input end and a product outlet end, a breading hopper disposed over said path, pumping slot means generally adjacent said input end for providing a selected quantity of breading to said input end of said conveyor means prior to the point of introduction of the product, and rotatable fluffer means coacting with said conveyor means adjacent said input end to ensure a generally smooth fluffy layer of the breading on said conveyor means prior to the introduction of the product to said conveyor means, said fluffer means being mounted on said frame over said input end.

2. A machine in accordance with claim 1 wherein said pumping slot means on said frame includes a slot roof member comprising laterally spaced side walls and a top wall, said fluffer means being rotatably mounted on said side walls above said top wall and in transversely extending relation to said slot roof member.

3. In a breading machine for selectively dispersing flour breading or free flowing breading on a food product passing therethrough comprising a frame defining a product conveyor path, conveyor means for conveying the product along said path and having a product input end and a product outlet end, a breading hopper disposed over said path, pumping slot means generally adjacent said input end for providing a selected quantity of breading to said input end of said conveyor means prior to the point of introduction of the product, and fluffer means coacting with said conveyor means adjacent said input end to ensure a generally smooth fluffy layer of the breading on said conveyor means prior to the introduction of the product, and wherein said fluffer means comprises a rotatably bar-like member extending generally transverse of said conveyor means above the latter, and power means for rotating said bar-like member, said bar like member being multi-surfaced in transverse cross-section.

4. A machine in accordance with claim 3 wherein said bar-like member is hexagonal in transverse cross-section.

5. A machine in accordance with claim 3 wherein said power means comprises a high speed hydraulic motor operatively coupled to said bar-like member.

6. A fluffer mechanism adapted for mounting generally adjacent the product input end of a breading machine which machine includes a frame and a conveyor on said frame for conveying food product from the conveyor input end to the conveyor outlet end of the machine, with a breading hopper disposed above the conveyor for applying an upper coating of breading to the food product, and pumping slot means adjacent the input end of the machine for providing a lower layer of breading to the conveyor prior to the point of introduction of the product to the machine, said fluffer mechanism comprising a rotatable member adapted to extend generally transverse of the machine conveyor, means for rotatably mounting said rotatable member on the frame of the machine adjacent the input end of the conveyor over the latter, and power means for driving said rotatable member.

7. A fluffer mechanism in accordance with claim 6 wherein said rotatable member comprises a multi-surfaced in transverse section bar-like member, and said power means comprising a motor, and coupling means drivingly connecting said motor to said bar-like member.

8. A fluffer mechanism in accordance with claim 7 wherein said motor is a relatively high speed hydraulic motor, and said multi-surfaced bar-like member is of hexagonal configuration in transverse cross-section, said bar-like member upon rotation thereof being operative to break up any caking or lumping of breading in an associated lower layer of breading in a breading machine to produce a generally smooth, fluffy lower layer of breading for completely and evenly coating the bottom surfaces of food products introduced onto the breading layer on the conveyor.

9. A fluffer mechanism in accordance with claim 7 wherein said motor is operative to rotate said bar-like member at a speed within a range of 400 to 500 revolutions per minute.

10. A fluffer mechanism in accordance with claim 7 wherein said bar-like member is rotatable in the direction of movement of the associated conveyor.

* * * * *